Dec. 22, 1959 D. J. GIMPEL ET AL 2,918,574

DIGITAL CONVERTER

Filed Jan. 10, 1955 8 Sheets-Sheet 1

Inventors
Donald J. Gimpel
William A. Davidson by Hill, Sherman, Meroni, Gross & Simpson Attys.

DIGITAL CONVERTER

Inventors
Donald J. Gimpel
William A. Davidson by Hill, Sherman, Meroni, Gross & Simpson Attys.

Dec. 22, 1959 D. J. GIMPEL ET AL 2,918,574

DIGITAL CONVERTER

Filed Jan. 10, 1955 8 Sheets-Sheet 3

Inventors
Donald J. Gimpel
William A. Davidson by Hill, Sherman, Meroni, Gross & Simpson Attys.

Inventors
Donald J. Gimpel
William A. Davidson
by Hill, Sherman, Meroni, Gross & Simpson Attys.

Dec. 22, 1959 D. J. GIMPEL ET AL 2,918,574

DIGITAL CONVERTER

Filed Jan. 10, 1955 8 Sheets-Sheet 5

Inventors
Donald J. Gimpel
William A. Davidson by Hill, Sherman, Meroni, Gross & Simpson Attys.

Inventors
Donald J. Gimpel
William A. Davidson
by Hill, Sherman, Meroni, Gross & Simpson Attys.

Inventors
Donald J. Gimpel
William A. Davidson by Hill, Sherman, Meroni, Gross & Simpson Attys.

Dec. 22, 1959 D. J. GIMPEL ET AL 2,918,574

DIGITAL CONVERTER

Filed Jan. 10, 1955 8 Sheets-Sheet 8

Inventors
Donald J. Gimpel
William A. Davidson
by Hill, Sherman, Meroni, Gross & Simpson Attys.

United States Patent Office 2,918,574

Patented Dec. 22, 1959

2,918,574

DIGITAL CONVERTER

Donald J. Gimpel, Chicago, and William A. Davidson, Evanston, Ill., assignors, by mesne assignments, to the United States of America as represented by the Secretary of the Navy Application January 10, 1955, Serial No. 480,916

7 Claims. (Cl. 250—27)

The present invention relates to novel means for generating a staircase-like voltage waveform including a pulse generator and an integrating circuit and particularly to such a generating means wherein the amplitude of pulses from the pulse generator is progressively increased as the output voltage from the integrating circuit increases. The invention also relates to novel digital converter means utilizing a staircase-like voltage waveform generating means, and particularly to such a converter means wherein an analog input is compared to the voltage output of the staircase-like voltage waveform generating means to control the conversion of the analog input into a digital output.

With the advent in recent years of large test and computing installations, many new and formidable problems have appeared. Among these is the problem of data reduction. Valuable information is often lost because of the effort required to reduce large amounts of data to a workable form. Accordingly, increased attention has been focused on automatic techniques to simplify and speed the reduction process. It has been found desirable at times to have the data appear automatically in tabulated form. Thus there has been a demand for devices which accurately and reliably convert an analog quantity (voltage, pressure, temperature, etc.) to a digital number at a rate sufficient for the task.

Prime objections to the prior art devices are either low accuracy or a low sampling rate and/or low precision which appears as a lack of stability. Another important criticism of prior art devices lies in the range of conversion. Many converters have a range to approximately 100 volts with, in many cases, the smallest step equal to 0.1 volt. Unfortunately, the output of many sensing elements is in the millivolt range, and requires amplification before conversion. The drift of the required amplifier reduces the accuracy and precision of the conversion.

The converter described herein features high accuracy (0.1%), high speed (100 samples per second), and relatively high stability. Both the accuracy and sampling rate are capable of further extension. Further, the particular form of the converter lends itself to the measurement of quantities ordinarily available only at a low signal level, thus extending the range of applicability of this technique. The resultant digital number is presented in a form suitable for recording.

It is an important object of the present invention to provide a novel digital converter system and method.

It is a further important object of the present invention to provide a novel system and means for generating a linear staircase waveform.

It is a more specific feature of the present invention to provide a novel method of coupling a pulse generator and integrator in such a way as to obtain a staircase generator having a greatly increased range.

A further object of the present invention is to provide a versatile high accuracy analog to digital converter, and novel circuit components therefor.

Other objects, features and advantages of the present invention will be more fully apparent from the following detailed description taken in connection with the accompanying drawings, in which:

Fgure 1 is a simplified block diagram of a digital converter according to the present invention;

I. PRINCIPLE OF OPERATION

The operation of the voltage-to-digital converter is based on the voltage developed across an integrating capacitor by the application of units of charge. If the applied charges were of constant size, the voltage across the capacitor would build up in a series of equal steps to generate a linear staircase waveform.

Figure 1:
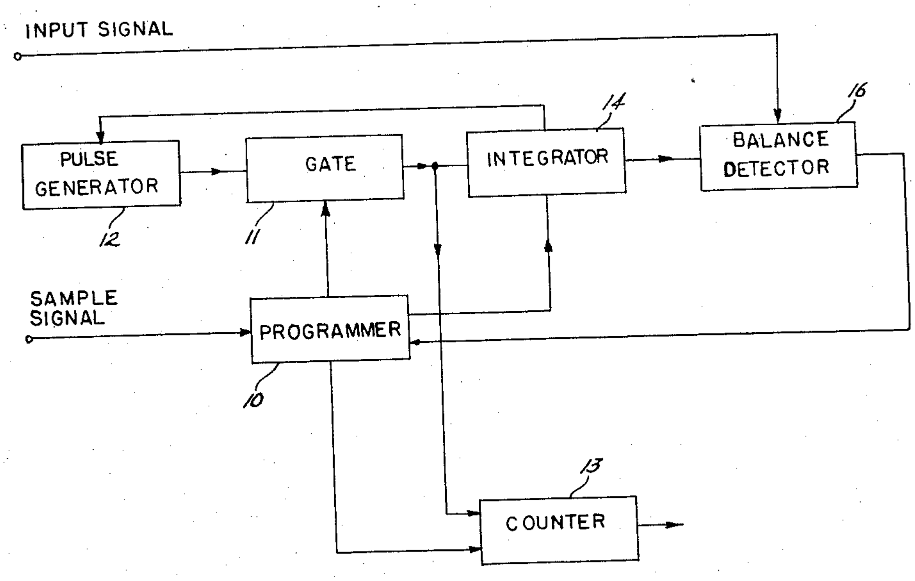

A block diagram of the basic system is shown in Fig. 1. When a sample pulse is received by the programmer 10, the gate 11 at the output of the standard pulse generator 12 is closed, allowing the system to function. At the same time, the pulses produced by the standard pulse generator are counted by the pulse counter 13. The voltage across the integrating capacitor of integrator 14 increases after each pulse. The balance detector 16 senses when the voltage across the integrating capacitor is equal to the input voltage (unknown intelligence). When this balance is reached, a pulse is sent from the balance detector to the programmer 10 which opens the gate 11 and causes the flow of pulses to the integrator 14 and pulse counter to cease. Immediaely, the integrating capacitor is discharged and after a short time the pulse counter is reset. The system is then ready for another sample cycle.

Figure 2:
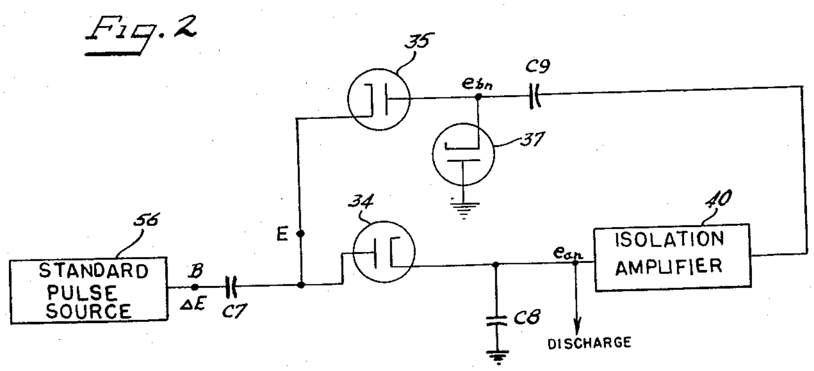
Figure 2 is a simplified diagrammatic showing of a staircase generator in accordance with the present invention.
Figure 9:
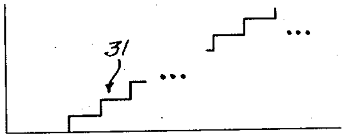
Figure 9 is a schematic illustration of the staircase waveform appearing across integrating capacitor C–8 in Figure 2.
Figure 10:
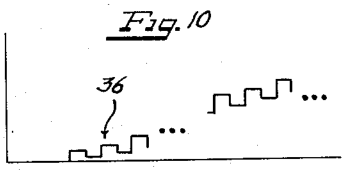
Figure 10 is a schematic illustration of the waveform at point E of Figure 2.

The success of this technique depends upon the linearity of the staircase voltage. A simplified staircase generator is illustrated in Fig. 2. The waveform across the integrating capacitor C–8 is illustrated in Fig. 9 at 31 and is seen to consist of a number of periodic, equal, increasing jumps or steps.

Figure 11:
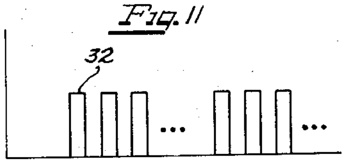
Figure 11 is a diagrammatic illustration of the driving pulse from the standard pulse source applied to the staircase generator of Figure 2.

The generator operates as follows, having reference to Fig. 2: Upon receipt of the first pulse 32 in Fig. 11, $\Delta E_1$, the voltage at point B rises by $\Delta E_1$, allowing diode 34 to conduct. As a result, C–7 and C–8 act as a voltage divider giving across C–8 a net voltage $$e_{a1}=\frac{C_7\Delta E}{C_7+C_8}\text{ volts}$$

At the end of the first pulse, the voltage at B drops $\Delta E_1$ volts, but tube 34 prevents discharge of C–8, thus causing its voltage to remain constant.

If provision for feedback by means of C–9 were not included (plate of diode 35 grounded), $e_{an}$, the voltage across capacitor C–8 after $n$ pulses have been received, would approach $\Delta E$ asymptotically from below with increasing $n$, where $n$ represents the number of pulses from the standard pulse source 56 counted from the beginning of a conversion cycle. Inclusion of feedback allows $e_{an}$ to increase until one of the diodes fails to operate or until the power supply voltage is reached. Generally this feedback alone gives the voltage range desired, but does not allow a linear staircase to be produced. Additional feedback to the standard pulse generator 12 as indicated in Fig. 1 is required for perfect linearity.

At the moment of balance, the discharge circuit is activated, causing $e_{an}$ to become zero. This in turn lowers $e_{bn}$ enough to allow diode 37 to conduct, clamping $e_{bn}$ to ground level.

II. MATHEMATICAL DEVELOPMENT

We assume that initially $$e_{an}=e_{bn}=0$$

and that all diodes act as perfect switches. It can be demonstrated that this latter assumption can be modified to include the case of a perfect switch in series with a battery (to simulate contact potential) without altering the solutions given below. We also assume that the isolation amplifier 40 has a negligible output impedance, an infinite input impedance, and that its gain is positive and less than or equal to unity (the latter insures that diode 35 remains open during the first half cycle).

Without further comment it can be demonstrated that this system satisfies the following set of difference equations.

$$e_{an}=(1-\gamma)e_{an-1}+\gamma e_{bn-1}+\gamma\Delta E_n \quad (1)$$

$$e_{bn}=\beta e_{bn-1}+(\alpha+\beta g)e_{an}-\beta g e_{an-1}-\alpha\Delta E_n \quad (2)$$

where:

$$\alpha=\frac{C_7}{C_7+C_9}$$

$$\beta=1-\alpha$$

$$\gamma=\frac{C_7}{C_7+C_8}$$

$C_7$, $C_8$, and $C_9$ are the capacitances of C–7, C–8, and C–9, respectively.

We seek the solution $$e_{an}=an$$

$$e_{bn}=bn$$

for then we obtain a linear staircase.

By substitution in (1) and (2), it can be shown that a linear solution does not exist for $g=1$. Of greater practical interest, however, is the case where $g<1$. If we were to assume that $$\Delta E_n=\Delta E+Ke_{an} \quad (5)$$

then substitution in (1) and (2) demonstrates that $$e_{an}=\frac{\gamma\Delta E_n}{1-\gamma k} \quad (6)$$

$$e_{bn}=\frac{\gamma\Delta E}{1-\gamma k}(1-k)n \quad (7)$$

This is true only for one particular value if $k$, that is where $$k=\frac{\alpha}{\gamma}+\beta(1-g) \quad (8)$$

For practical values of $C_7$ and $C_8$, $k<1$. Thus, the fact that a linear solution exists for $g<1$ allows the isolation amplifier to consist merely of a cathode-follower.

It is important to note that the above statements have merely shown the existence of a linear solution, not eliminating the possibility of other solutions. However, further analysis demonstrates that the linear solution is the only solution to the difference equation when $k$ assumes the value given by (8).

The maximum voltage that can be developed across the integrating capacitor is determined by the maximum voltage obtainable across diode 34, which occurs when $$e_{an}-e_{bn}=\Delta E_n$$

From this relation we find that $$\text{Max }(e_a)<\frac{\Delta E}{k}$$

which usually exceeds the power supply voltage.

Assuming a battery in series with the diodes merely modifies the $E_n$ terms of (1) and (2) which are then replaced by $\Delta E_n+E_d$. This does not affect the equation for $k$, thus a linear solution would still exist for the same value of $k$.

III. DESCRIPTION OF COMPONENTS

A complete converter may be broken down into five major parts, as follows:

(1) Standard Pulse Generator
(2) Staircase Generator
(3) Balance Detector
(4) Control Pulse Generator
(5) Pulse Counter The overall arrangement and operation of these components will now be described having reference to the block diagram of Figure 3.

Initially, the control bistable (flip-flop) multivibrator 50 is in an "off" state to hold the 200 kc. astable (free-running) multivibrator 51 in a non-oscillating condition, and to energize the discharge circuit 52 which maintains the voltage on the integrating capacitor C–8 equal to zero.

When a start pulse is received from the 100 c.p.s. astable multivibrator or pulse initiating means 53 or from any suitable external source the control bistable multivibrator 50 flips to its "on" state to gate the 200 kc. astable multivibrator 51 to its free-running condition, and to de-energize the discharge circuit 52.

Figure 3:
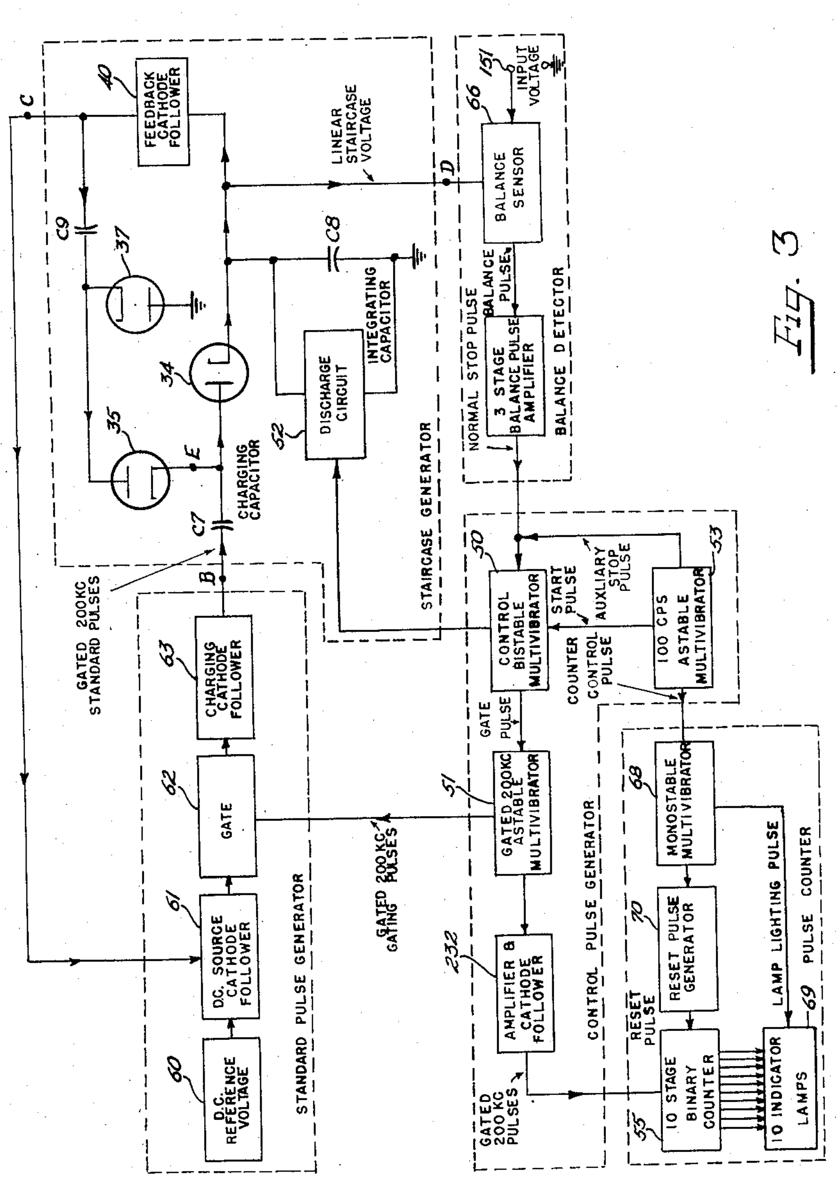
Figure 3 represents a block diagram of a complete digital converter according to the present invention.

Each pulse generated by the 200 kc. astable multivibrator 51 produces one count on the binary counter 55 or other suitable digital output means and one standard pulse at the output of the Standard Pulse Source indicated at 56 in Figure 2 and illustrated in Figure 3 as comprising a D.C. reference voltage block 60, a D.C. source cathode follower 61, a gate 62 and a charging cathode follower 63. In turn, each of these standard pulses produces one step of the linear staircase voltage. The instant that the staircase voltage exceeds the input voltage applied at 151 in Figure 3, a normal stop pulse is produced at the output of the balanced detector. This pulse flips the control multivibrator or pulse interrupting means 50 back to its "off" state, thereby gating off the 200 kc. astable multivibrator 51 and energizing the discharge circuit 52.

The time interval between the start pulse and the normal stop (or balance) pulse is directly proportional to the input voltage applied at lead 151 and is about 5000 microseconds for a "full scale" count of 1000. In the event that the input voltage exceeds the "full scale" value, the control bistable multivibrator is flipped to its "off" state by the auxiliary stop pulse. This auxiliary stop pulse is generated by the 100 c.p.s. astable multivibrator 53 about 6000 microseconds after the start pulse.

At the instant when the auxiliary stop pulse is generated, the monostable (single-shot) multivibrator 68 in the pulse counter applies voltage to the indicator lamps of the binary counter stages indicated at 69. These lamps indicate the count accumulated in the binary counter 55 by the 200 kc. pulses and thus give a direct measure of the input voltage. After voltage has been applied to the indicator lamps for approximately 3000 microseconds, the monostable multivibrator 68 simultaneously removes the voltage (thus blanking the lamps) and triggers reset pulse generator 70 which automatically resets the binary counter 55 to its initial count. This reset pulse is thus generated about 9000 microseconds after the start pulse.

About 10,000 microseconds after the original start pulse, the 100 c.p.s. astable multivibrator 53 generates a new start pulse and another cycle begins.

A. *Standard Pulse Generator*

Figure 4:
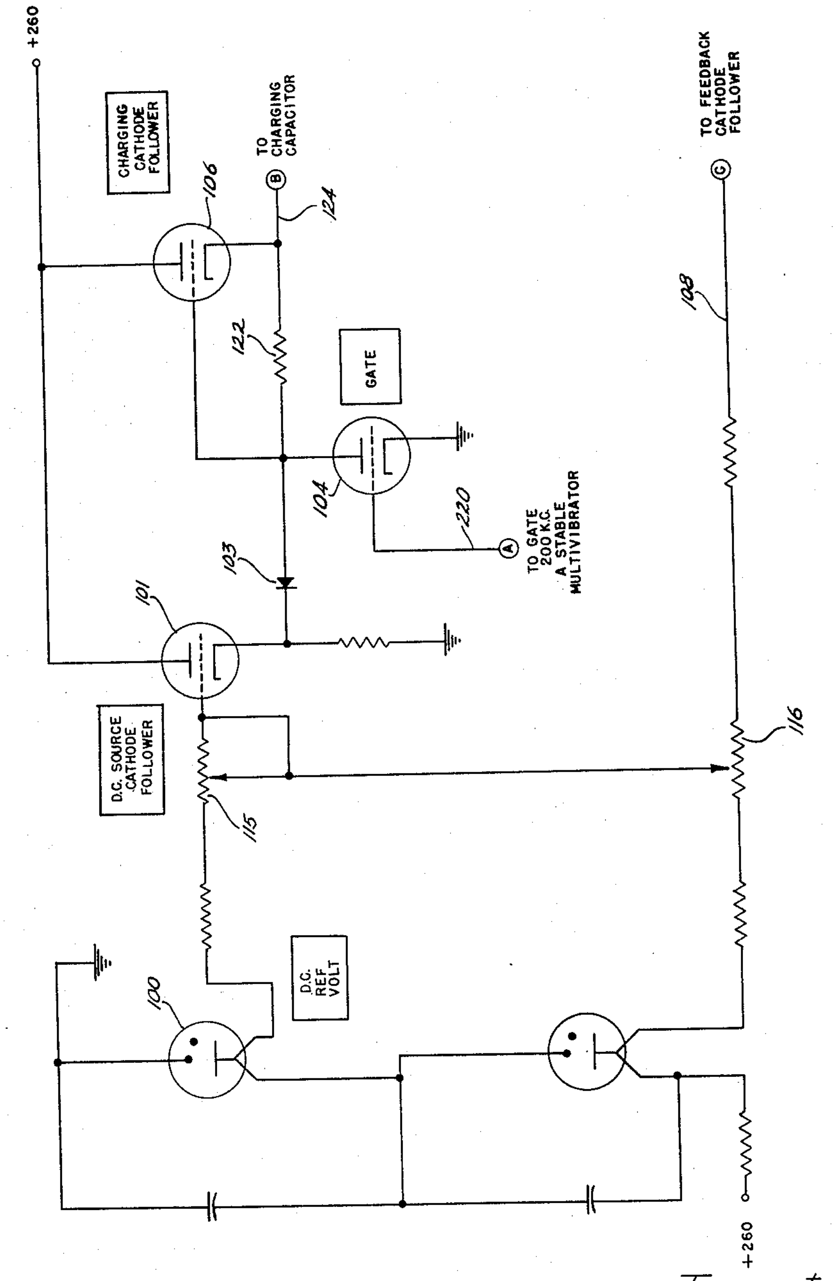
Figure 4 is a schematic circuit diagram illustrating a standard pulse generator component suitable for the converter of Figure 3.

The Standard Pulse Generator produces voltage pulses of stable amplitude for application to the charging capacitor C–7. It is mandatory that these pulses have a stable amplitude; since the size of the steps of the staircase voltage are proportional to the height of the standard pulses, any variation of the step size reduces the accuracy of conversion. The complete circuit of the Standard Pulse Generator is shown in Fig. 4.

The voltage reference tube 100 is a glow discharge tube which provides a relatively stable D.C. voltage. A D.C.-source cathode-follower tube 101 is used primarily to isolate 100 from the pulsed load produced by the combination of rectifier 103, tube 104 and tube 106. The secondary function of the cathode-follower 101 is to provide a convenient point through which feedback (through lead 108) from the feedback cathode-followers 110 and 111 (Figure 5) can be introduced. The amount of feedback can be adjusted with a potentiometer 115 to change the linearity of the converter. However, adjustment of 115 would also change the operating level of the grid of 101 if a steady state current were permitted to flow in a part of 115. Potentiometer 116 permits balancing out of this steady state current.

When the 200 kc. astable multivibrator 51 is gated off, the grid conduction of gate tube 104 holds its grid voltage at zero. Due to this zero bias on 104 it conducts heavily, and in effect returns the cathode resistor 122 and grid of charging cathode-follower 106 to nearly ground potential. As a result, the cathode of 106 and conductor 124 are only a few volts above ground. Rectifier 103 prevents the heavily conducting gate 104 from shorting the output of the D.C.-source cathode-follower 101.

Each time the 200 kc. astable multivibrator 51 produces a pulse, the voltage at the grid of gate 104 drops to a sufficiently negative value to cut off the tube. As a result, the cathode resistor 122 and grid of 106 are returned to the cathode of 101 through 103. In this condition, the cathode of 106 is only a few volts above the reference voltage of tube 100.

The difference in the two voltages which appear alternately on the cathode of 106 is the amplitude of the standard pulses which are applied to the charging capacitor (C–7) through lead 124. Since this pulse amplitude is determined almost completely by the magnitude of the D.C. reference voltage, the stability of the pulse amplitude is nearly equal to that of the D.C. reference voltage.

B. *Staircase generator*

The operation of the staircase generator has been generally described in Part I hereof with reference to Figure 2. A more detailed circuit diagram of the generator appears in Figure 5.

The two cascaded cathode-followers 110 and 111 are used for the feedback cathode-follower to obtain two necessary characteristics unobtainable with a single tube. These are a very high input impedance in 110 and a relatively low output impedance in 111. Constant-current pentode loads 130 and 131 are used for both cathode-followers to obtain a high degree of linearity in their input-output characteristics.

When the integrating capacitor C–8 is discharged by triode 135 and the voltage at conductor 108 drops back to its initial value, the voltage on the side of C–9 connected to diode 35 tends to become negative due to the small charge accumulated on C–9 during the generation of the staircase. To prevent this charge building up from one staircase cycle to the next, diode 37 is used to clamp the side of C–9 connected to diode 35 to approximately ground potential during the discharge of C–8.

The plate of diode 37 is returned to a slight negative voltage on potentiometer 137 to compensate for the contact potential of the tube which would start charging C–8 as soon as the discharge tube 135 was cutoff. This additional charging source would alter the shape of the staircase voltage and therefore decrease the accuracy of the device.

The cathode of tube 135 is returned to a slight positive voltage on potentiometer 139 to compensate for the contact potential of tube 135 and permit setting the initial voltage on C–8 to provide a "Zero" adjustment for the converter.

C. *Balance detector*

Figure 5:
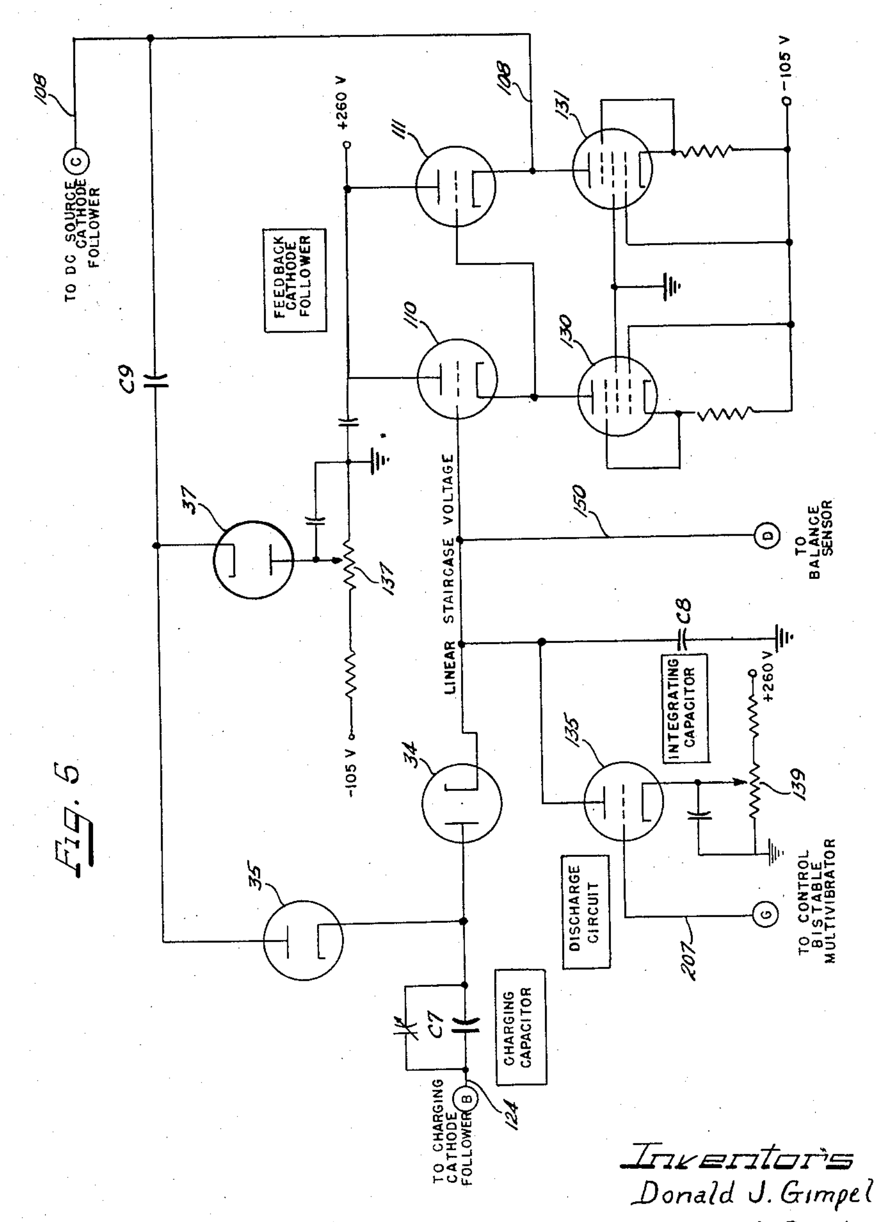
Figure 5 is a schematic circuit diagram of a staircase generator suitable for use in the converter of Figure 3.
Figure 6:
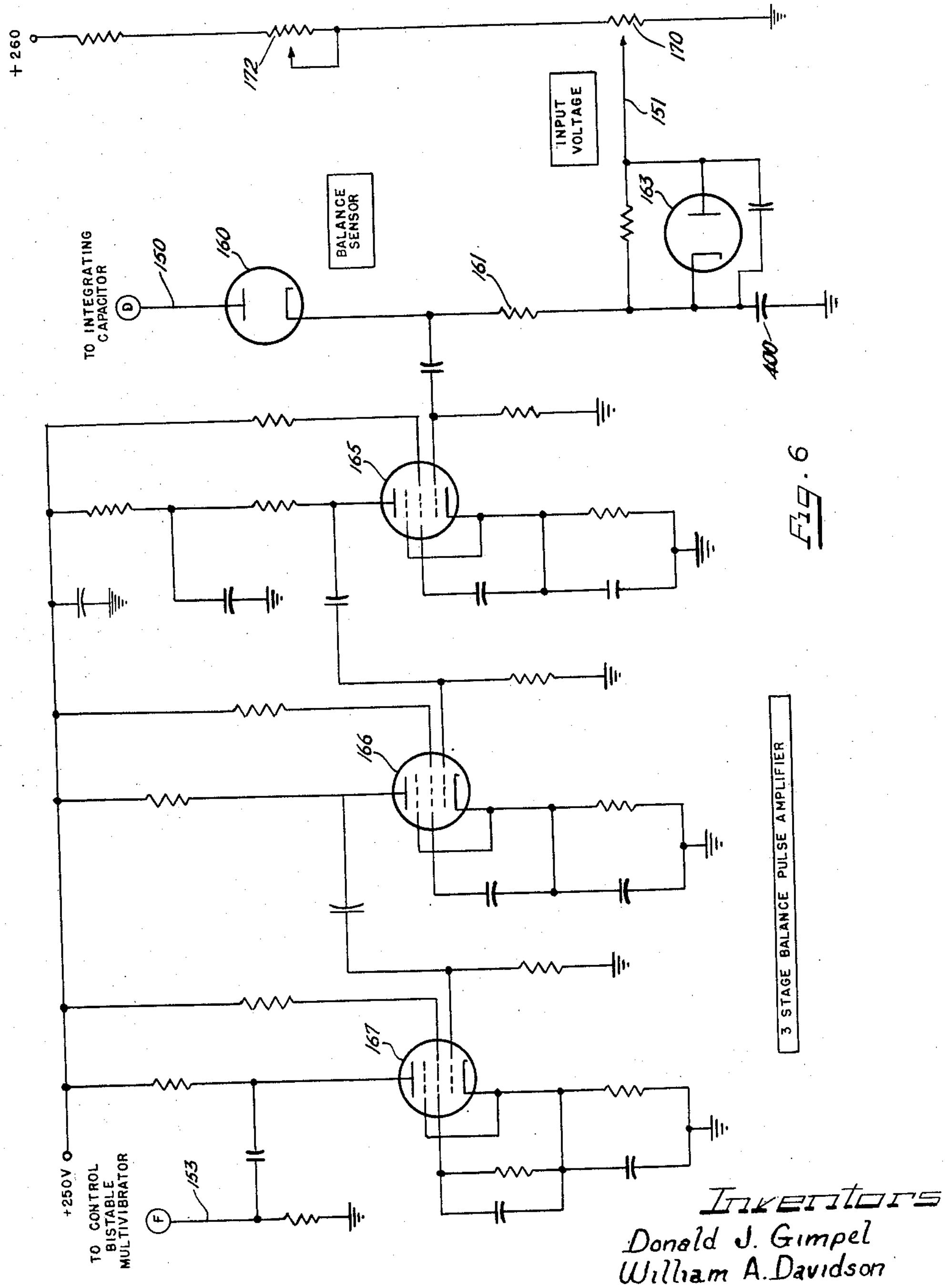
Figure 6 is a schematic circuit diagram illustrating a balanced detector suitable for use in the converter of Figure 3.

The balance detector or comparator comprising balance sensor 66 and the balance pulse amplifier indicated in Figure 3 compares the generated staircase voltage appearing at conductor 150 in Figures 5 and 6 to the unknown input voltage introduced at 151 and produces a sufficiently large output pulse at conductor 153 to flip the control bistable multi-vibrator (50 in Figure 3) into its "off" state at the instant when the staircase voltage exceeds the unknown input voltage. The circuit of the balance detector is shown in Fig. 6.

The balance sensor diode 160 is connected in series with resistor 161 between the conductors 150 and 151. Thus when the staircase voltage exceeds the input voltage, diode 160 conducts and causes a sudden voltage drop across resistor 161. This small voltage pulse is amplified in the three state balance pulse amplifier using pentodes 165, 166 and 167 and becomes the normal stop pulse for the control bistable multivibrator. The balance pulse amplifier is designed to have a rise time which is short, compared to the duration of one step (5 microseconds), in order to "stop" the control bistable multivibrator before the next step is generated.

Due to the contact potential of diode 160 the balance pulse would normally be produced when the staircase voltage was below the correct balance point. Although a small fixed D.C. voltage could be added in series with either the staircase or the input voltage to counteract the contact potential, such a method would be unsatisfactory since changes in the heater voltage or aging of diode 160 would change the balance point. For this reason, the contact potential of diode 163 is introduced to counteract changes in diode 160.

For test purposes, the input voltage applied to conductor 151 is obtained from a precision linear potentiometer 170. The converter is first "zero" adjusted by setting the dial on 170 (1000 divisions full scale) to three divisions and adjusting potentiometer 139 (Figure 5) to produce a count of three. Then potentiometer 170 is adjusted to 960 divisions and potentiometer 172 is adjusted to produce a count of 960. After this calibration is performed, potentiometer 170 can be used as a standard of linearity and any deviation between the dial calibration of 170 and the count on the pulse counter represents the non-linearity of the device. The loading effect on 170 is negligible since the effective input resistance at conductor 151 is about 2500 megohms.

In normal use, the input voltage applied to conductor 151 is obtained from an unkown input voltage connected to an external input terminal (not shown).

D. *Control pulse generator*

Figure 7:
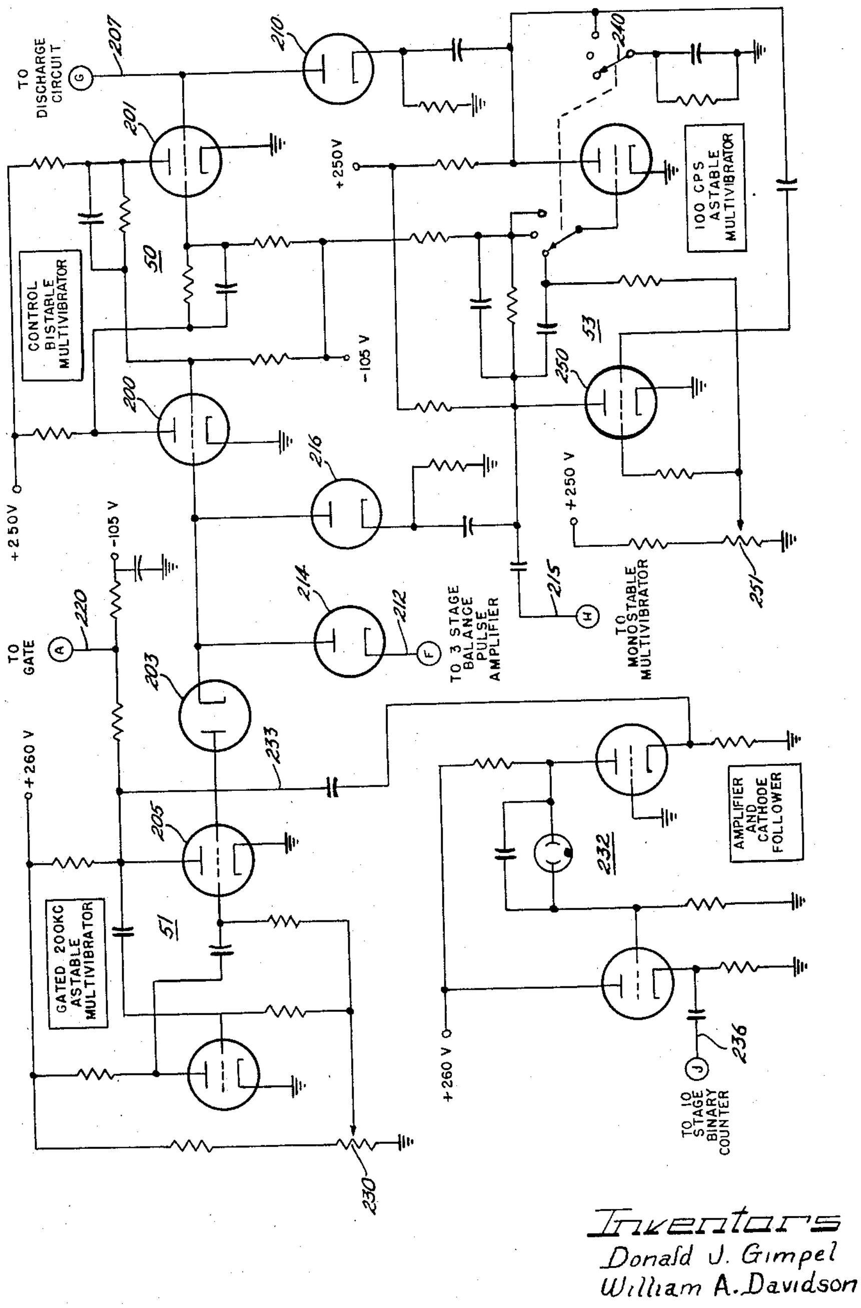
Figure 7 is a schematic circuit diagram of a control pulse generator suitable for use with the converter of Figure 3.

The control pulse generator produces the necessary programming signals for controlling the entire converter. The two major control functions of gating the 200 kc. astable multivibrator and switching the discharge circuit on and off are performed by the control bistable multivibrator 50. The circuit diagram of the control pulse generator is shown in Fig. 7.

When the control bistable multivibrator is in its "off" state, tube 200 is cutoff with a large negative voltage on its grid, and tube 201 is conducting with its grid at ground potential. In this condition, diode 203 holds the grid of tube 205 at the same large negative voltage that is present on the grid of tube 200. Thus tube 205 is also cutoff and the 200 kc. astable multivibrator 51 cannot oscillate (or is effectively "gated off"). The grid of the discharge circuit triode 135 (Figure 5) is connected directly through conductor 207 to the grid of tube 201. Thus the zero bias of tube 201 maintains triode 135 in a heavily conducting condition (discharge circuit on).

When a start pulse is applied to the grid of 201 from the 100 c.p.s. astable multivibrator 53 (through diode 210), the conditions of grid voltages of 200 and 201 interchange to produce the "on" condition. Thus tube 200 is conducting with its grid at ground potential and tube 201 is cutoff with a large negative voltage on its grid. With the grid of tube 200 at ground potential, diode 203 cannot hold tube 205 cutoff and thus the 200 kc. astable multivibrator 51 oscillates normally (or is "gated on"). The large negative voltage on the grids of 201 and triode 135 cuts off 135 (discharge circuit off).

The control bistable multivibrator 50 is returned back to its "off" condition by the pulse applied to the grid of tube 200 from the balance pulse amplifier through conductor 212 and diode 214 or from the 100 c.p.s. astable multivibrator 53 through diode 216.

When the 200 kc. astable multivibrator is "gated on," the voltage at conductor 220 periodically (at a rate of 200 kc.) jumps from a large negative voltage when tube 205 is cutoff, to zero due to grid conduction of gate tube 104 (Figure 4) when tube 205 is conducting, and back again. This nearly square wave provides the 200 kc. gating signal for gate tube 104. The frequency of oscillation of the 200 kc. astable multivibrator can be adjusted with potentiometer 230.

The amplifier and cathode-follower 232 (Figures 3 and 7) are used simply to provide pulses from the 200 kc. astable multivibrator (via conductor 233) which have sufficient amplitude and power to drive the binary counter in the pulse counter (via conductor 236).

A provision for single cycle operation of the converter is incorporated into the circuit of the 100 c.p.s. astable multivibrator 53. With switch 240 in the position shown, the circuit behaves as an astable or free-running multivibrator operating at 100 c.p.s. The circuit is changed to a monostable or one-shot multivibrator with switch 240 in the other two positions by biasing tube 250 beyond cutoff. A single pulse is initiated by momentarily moving switch 240 to its right hand position. The frequency of oscillation of the 100 c.p.s. astable multivibrator can be adjusted with potentiometer 251.

E. *Pulse counter*

Figure 8:
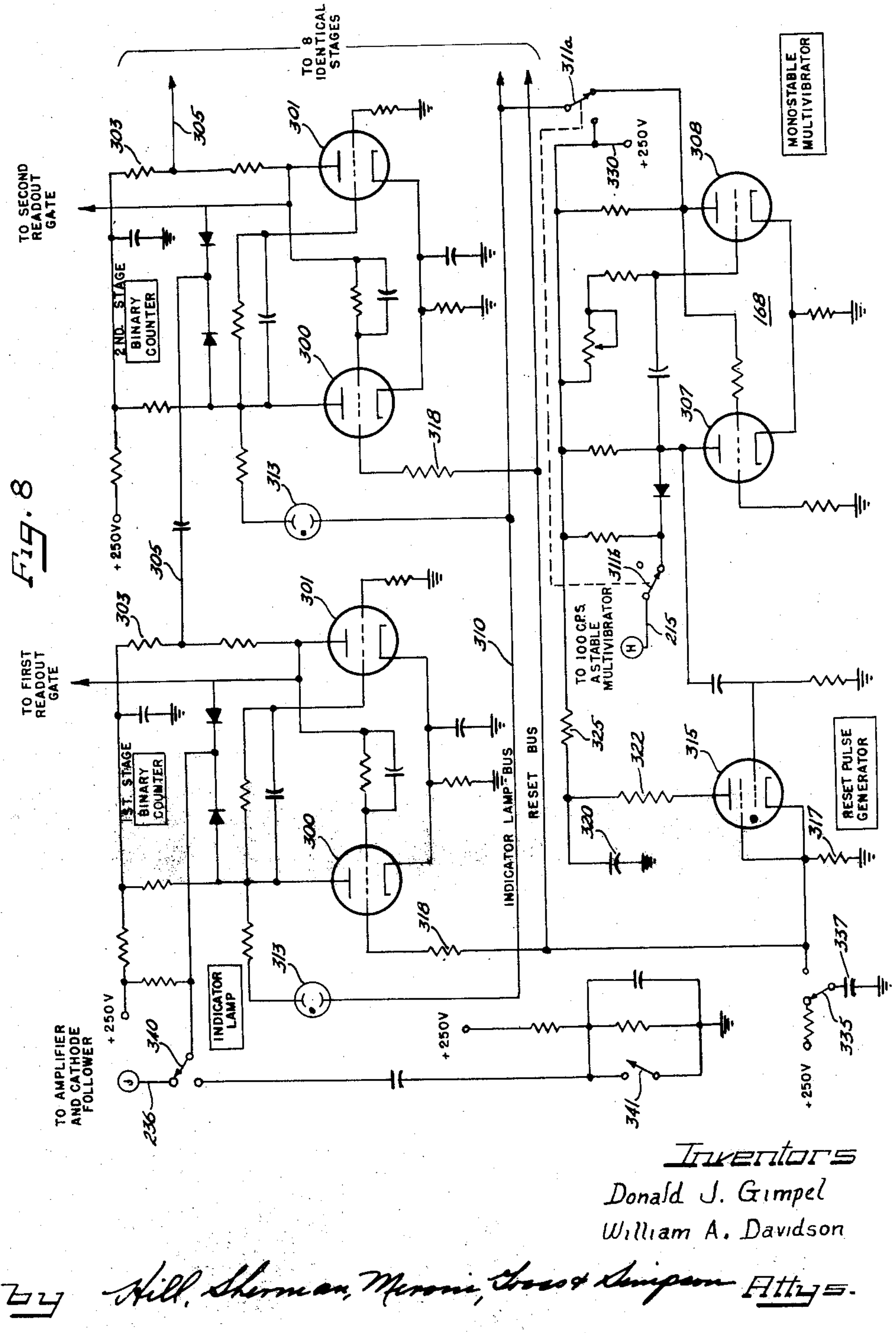
Figure 8 is a schematic circuit diagram of a pulse counter suitable for use in the converter of Figure 3.

The pulse counter counts the number of 200 kc. pulses that are generated between the start and stop pulses. Thus the counter provides a means of reading the number of pulses, and thus the input voltage, in digital form. For adjustment purposes, a visual indication of the count accumulated per staircase cycle is provided. The circuit diagram of the pulse counter is shown in Fig. 8.

All switches are shown in their normal positions for automatic (100 c.p.s.) operation. In reset condition of the counter, tube 300 of each stage is conducting and tube 301 cutoff. Each of the 200 kc. pulses applied to the binary counter causes the first stage to flip alternately between its two stable states. Each time tube 301 changes from a cutoff state to a conducting state (but not vice versa), the pulse produced across resistor 303 flips the following stage through conductor 305. Thus for every two input pulses applied to a stage, the following stage is flipped once. This process is repeated for all 10 stages of the counter. As a result, the 10th stage is flipped once for every 512 of the 200 kc. pulses applied to the first stage.

In its normal condition tube 307 of the monostable multivibrator 168 is cutoff and tube 308 is conducting. The circuit constants are arranged to produce a voltage on the plate of tube 308 in the normal condition, which is approximately midway between the two voltages produced on the plates of the binary counters by their conducting and cutoff states. In addition, the voltage difference between the normal plate voltage of tube 308 and the plate voltage of the counters in either state is less than the firing voltage of neon indicator lamps. Thus with the lamp bus 310 connected to the plate of tube 308 through switch 311*a* the lamps will not light.

The monostable multivibrator 68 flips to its unstable state when it receives the counter control pulse (about 6000 microseconds after start pulse) from the 100 c.p.s. astable multivibrator 53 via conductor 215. In this unstable state, tube 308 is cutoff and its plate voltage rises to a value which is only slightly less than the supply voltage. Thus the neon lamps 313 which are connected to any tube 300 which is conducting can now fire (light) to indicate the count accumulated in the counter during the generation of the 200 kc. pulses. By allowing the neon lamps to thus light only during the time when the counter is not operating, the count clearly and without ambiguity or eye fatigue.

After the monostable multivibrator 68 has been in its unstable state for about 3000 microseconds, it returns to its normal condition and thus extinguishes the neon indicator lamps. The instant that the monostable multivibrator returns to its normal condition, it generates a pulse which fires thyratron tube 315. This thyratron is normally held in a non-conducting state by the bias voltage developed across resistor 317 produced by the current flowing to ground through resistor 318 of each binary stage. Capacitor 320 is thus rapidly discharged through the series combination of resistor 322, tube 315 and resistor 317, producing a voltage pulse across resistor 317. This reset pulse is applied through each resistor 318 to the grid of each tube 300 of the binary counter, thus forcing each stage to assume a reset condition with each tube 300 conducting and each tube 310 cutoff. At the end of the reset pulse, the thyratron 315 extinguishes and permits condenser 320 to recharge through resistor 325 for the next cycle.

It is recalled that the balance pulse is obtained only after the staircase voltage exceeds the input voltage.

Thus, if the input voltage were zero, one pulse would be sent to the couter. In order to make the counter read correctly, the counter is initially reset to a count of minus one. For a counter of *m* stages, this is equivalent to a count of $2^m-1$. In this manner, if the input voltage were zero, the one pulse sent to the counter would cause it to read the correct value, zero.

For single cycle operation, it is desirable to have the neon lamps give a continuous indication of the count in the counter. This change in neon lamp operation can be affected by throwing switch 311*a*, *b* to its other position, thereby connecting the lamp bus 310 directly to the supply voltage through switch 311*a* and conductor 330. In addition, switch 311*b* prevents the counter control pulse at conductor 215 from being applied to the monostable multivibrator 68, thus preventing the automatic reset pulse from being generated and permitting the accumulated count to remain in the counter until it is manually reset. A manual reset pulse is developed by moving switch 335 to its right hand position, discharging condenser 337 into resistor 317.

Provision is made for checking the binary counters by applying single, manually initiated pulses instead of the gated 200 kc. pulses. This check is made by changing the input to the counters by moving switch 340 to its lower position. One pulse is then applied to the counter each time switch 341 is closed.

IV. EXPERIMENTAL RESULTS

A. *Waveforms*

Photographs of oscilloscope traces produced by three voltages generated at various points of interest in the converter are shown in Fig. 12–17. The three oscillograms in Figs. 12, 14 and 16 were obtained with a full scale count of 1000 and the same vertical sensitivity. For the oscillograms of Figs. 13, 15 and 17 the same voltages were displayed, but to show greater detail the number of pulses and steps was reduced to 10, the time scale (horizontal) was expanded 167 times, and different vertical sensitivities were used.

The upper oscillograms (Figs. 12 and 13) show the standard pulses developed at point B of Figure 3. The shape of these pulses is apparent in Fig. 13 while in Fig. 12 the tops of the 1000 pulses appear to merge and form a sloping line. The gradual increase in the amplitude of these pulses (indicated by the sloping line) is produced by the feedback from the staircase generator through point C of Figure 3 to the standard pulse generator.

The lower oscillograms (Figs. 16 and 17) show the staircase voltage developed at point D. The individual steps of this staircase voltage are quite evident in Fig. 17 but in 16 the 1000 steps appear to merge and form a sawtooth.

Figure 14:
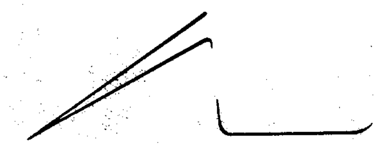
Figure 14 shows the voltages developed at point E in Figure 3.
Figure 15:
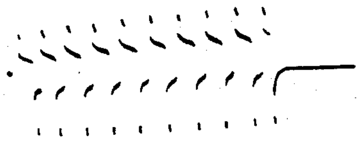
Figure 15 shows the waveform at E in Figure 3 as in Figure 14, but on an expanded time scale.
Figure 16:
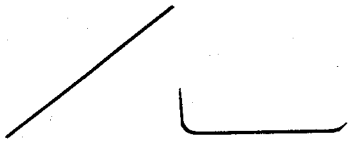
Figure 16 shows the staircase voltage developed at point D in Figure 3 across the integrating capacitor C–8.
Figure 17:
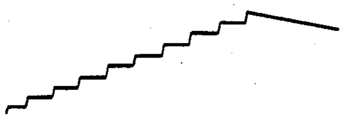
Figure 17 is similar to Figure 16, but taken on an expanded time scale.

The center oscillograms (Figs. 14 and 15) show the voltage developed at point E of Figure 3 at the juncture C–7, and tubes 34 and 35. The upper trace in Fig. 14 is the same as Fig. 16 and is produced during the application of each standard pulse. The lower trace is produced by the voltage maintained through tube 35 and C–9 when each standard pulse is removed. In Fig. 15 the short pulses on each step and the relatively large separation between the upper and lower staircase are probably due to a combination of interelectrode and stray capacitance, contact potential, and the forward resistance of diodes 34, 35 and 37.

B. *Input resistance*

An approximation to the effective input resistance of the device at point E was found by opening the input at point E and permitting capacitor 400 (Figure 6) to supply the input voltage. The input resistance was calculated from the time required for the count to change a given percentage. This calculation yielded an input resistance of about 2500 megohms including all leakage resistance.

C. *Linearity*

The dial calibration of the precision potentiometer 170 can be used directly to determine the relative input voltage. Potentiometer 170, which has a nominal linearity of 0.05%, is first calibrated at counts and dial settings of three and 960 as previously described. Using the dial calibration as a standard, the maximum error of the device over a range of three to 1000 counts and dial divisions is ±0.5 divisions.

D. *Stability*

Stability tests were run with all voltage sensitive circuits connected to a high stability supply (+260 v.) and all others to a low stability supply (+250 v.). A 90 volt battery was connected as the input standard. A variation of 1% in the high stability supply voltage resulted in a 0.23% change in count. Variation of the low stability supply resulted in no perceptible change in the digital member. A variation of 1% in the heater voltage of all critical tubes resulted in a 0.083% change of count. Drift over a 5.5 hour period was observed to be within one count. The ambient temperature varied by 1° F. during the test.

E. *Frequency dependence*

Figure 18:
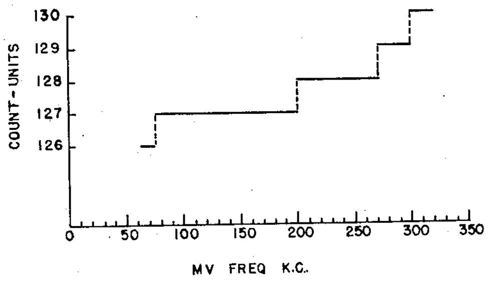
Figure 18 is a diagrammatic illustration of the effect of standard pulse generator frequency on the count generated by the converter.
Figure 12:
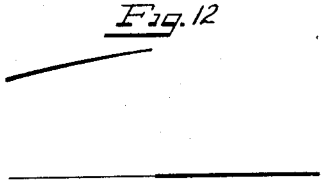
Figure 12 is an oscillogram of the voltage waveform at point B in Figure 3.
Figure 13:
Figure 13 is a further oscillogram at point B of Figure 3 but taken on an expanded time scale.

Since the principle upon which this device is based depends only upon the number of pulses and steps required to produce balance and not upon the rate at which the pulses and steps are generated, the count produced by the device should be independent of the frequency of the 200 kc. multivibrator. To check the device for frequency dependence potentiometer 170 (Figure 6) was adjusted to produce a count of 128 and the multivibrator's frequency was varied over a range of 65 to 325 kc. by means of 230 (Fig. 7). The results are shown in Fig. 18. While this figure shows that the device is not completely independent of frequency, it is apparent that a highly stable oscillator is not required.

V. OTHER APPLICATIONS

If provision is made for pre-setting the register to any desired number, either manually or electrically, and if the pulse generator is stopped when the last stage of the register changes from a one to a zero count, then it is observed that the voltage to digital converter is also a digital to voltage converter. In this case the voltage output which is the peak voltage on the integrating capacitor will be proportional to the complement of the input number. The voltage would be directly proportional to the input number if a backward counter were used and the pulse generator stopped when the last stage changed from a zero to a one count. This conversion would be accomplished to the same accuracy as before, i.e., 0.1%.

When the unit operates as a voltage-to-digital converter, the output number, N, is observed to be proportional to the unknown input and inversely proportional to the size of the steps. The size of the steps is closely approximated by $$\frac{C_7}{C_8}\Delta E$$

since for practical values $\gamma k<<1$ and $C_7<<C_8$. Thus the number N is inversely proportional to $C_7$. In the following we assume that $C_8$, $\Delta E$, and the "unknown" voltage are constant.

In the case of a plane parallel plate capacitor, the capacitance is inversely proportional to the plate separation, neglecting fringing effects. Thus if such a capacitor were used for C–7 in the converter, the resultant number would be directly proportional to plate separation. Since the value of capacitance used for C–7 lies in the range of values found in existing pressure transducers, such devices could be used directly for C–7 to produce digital pressure measurements. Similarly temperature, distance, acceleration, and all other physical quantities which can be resolved as a small displacement can be measured digitally.

In this case the sensing element is no longer required to convert the physical quantity to a voltage and then to a digital number. The sensing element is itself an integral part of the converter and as a consequence the analog-digital conversion is direct without an intermediate stage.

Conventional capacitor type pressure measurement systems are linear over a relatively short range since the output is a hyperbolic function of the plate separation. If the pickup were to be used with the above unit, however, the number output would be linear over its entire range except for cetain small side effects. Thus, not only could measurements be made digitally but they could be made over a wider linear dynamic range with a given gage.

VI. SUMMARY

It will thus be understood that the inner feedback loop including capacitor C–9 in Figure 3 serves to reduce the charge on coupling capacitor C–7 after each pulse from the pulse generator. The larger the value of capacitance C–9 in relation to capacitance C–7, the greater the reduction in charge which is effected after each pulse. It has been found desirable to have the capacitance of C–9 at least ten to twenty thousand times as great as C–7. Further, the ratio between C–7 and C–8 determines the approximate ratio of step amplitude to standard pulse amplitude, so that for example to obtain 0.1 volt steps using an 80 volt standard pulse, the capacitance of C–7 should be about $\frac{1}{800}$ that of C–8. Typical values for the capacitors are: C–7, 27 micromicrofarads; C–8, 0.02 microfarad; and C–9, 0.5 microfarad.

The outer feedback loop connected at point C in Figure 3 to the feedback cathode follower 40 is connected to the standard pulse generator as shown in Figure 4 by means of conductor 108 and potentiometer 115 and serves to increase the pulse delivered from the standard pulse generator for each step by an amount generally to compensate for the increase in voltage across C–8. The outer feedback loop thus progressively increases the amplitude of the pulses from the standard pulse generator as the charge on the integrating capacitor C–8 builds up.

As previously mentioned in connection with the description of the Standard Pulse Generator, cathode-follower tube 101, Figure 4, provides a convenient point at which feedback from the feedback cathode-followers or feedback voltage means 110 and 111, Figure 5, can be introduced. The feedback cathode-followers 110 and 111 comprise a translating device having an input electrode (the grid of tube 110), connected to the output of the integrating means C–8 and an output electrode (cathode of tube 111) connected to the feedback circuit including conductor 108, Figures 4 and 5, and potentiometer 116, potentiometer 115 and voltage reference tube 100, Figure 4. In the appended claims, the term "translating device" shall be used to refer to a discharge tube or similar device wherein the input thereto has a significant control function with respect to the output thereof. It will be observed that the cathode follower tube 101 may be termed a translating device having an input circuit including resistance means 115 and constant potential means (tube 100) in series and having an output circuit for providing a voltage (between the cathod of tube 101 and ground) controlling the amplitude of pulses delivered to the integrating circuit including capacitor C–8.

We claim as our invention:

1. In combination, a pulse generator comprising reference voltage means for providing a reference voltage, cathode follower means having an input connected to said reference voltage means, an integrating circuit including a charging capacitance and an integrating capacitance in series, means connected to the output of said cathode follower means for generating pulses referenced to said reference voltage means and for delivering said pulses to said integrating circuit, and isolation means having a high impedance input connected to said integrating capacitance and having a low impedance output connected to the input of said cathode follower means.

2. In combination, a pulse generator comprising reference voltage means providing a reference voltage, cathode follower means having an input connected to said reference voltage means, an integrating circuit including a charging capacitance and an integrating capacitance in series, means connected to the output of said cathode follower means for generating pulses referenced to said reference voltage means and for delivering said pulses to said integrating circuit, isolation means having a high impedance input connected to said integrating capacitance and having a low impedance output connected to the input of said cathode follower means, a charge replenishing circuit connected between said integrating capacitance and said charging capacitance for progressively replenishing the charge on said charging capacitance, and a rectifier means interposed between the connection of the replenishing means with the charging capacitance and the integrating capacitance.

3. In combination, a pulse generator comprising a D.C. source, cathode follower means having an input connected to said D.C. source, an integrating circuit including a charging capacitance and an integrating capacitance in series, means connected to the output of said cathode follower means for generating pulses reference to said D.C. source and for delivering said pulses to said integrating circuit, isolation means having a high impedance input connected to said integrating capacitance and having a low impedance output connected to the input of said cathode follower means, a charge replenishing feedback circuit connected between said integrating capacitance and said charging capacitance for progresively replenishing the charge on said charging capacitance, rectifier means interposed between the connection of the replenishing means with the charging capacitance and the integrating capacitance, feedback capacitance means in the feedback circuit to said charging capacitance, and clamping means for clamping the feedback capacitance means to a low potential between conversion cycles.

4. In combination, integrating means having an input and an output, pulse supplying means connected with the input of said integrating means for supplying a series of pulses to said integrating means and including a translating device having an output circuit for providing a voltage controlling the amplitude of pulses delivered to said integrating means and having an input circuit controlling the value of said voltage in the output circuit, feedback voltage means having an input connected to the output of said integrating means for providing at its output a voltage dependent upon the voltage at the output of said integrating means, and means providing a feedback circuit connected between the output of said feedback voltage means and the input circuit of said translating device for varying the amplitude of pulses delivered to said integrating means in accordance with the voltage at the output of said integrating means.

5. The combination of claim 4 wherein said feedback voltage means comprises cathode follower means having its input connected to the output of said integrating means and having its output connected to said feedback circuit.

6. The combination of claim 4 wherein said feedback voltage means comprises a translating device having an input control electrode connected to the output of said integrating means and having an output electrode connected directly with said feedback circuit.

7. The combination of claim 4 wherein said translating device comprises cathode follower means having an input circuit including resistance means and constant potential means in series, and said feedback circuit includes said resistance means and is operative to introduce a voltage drop across said resistance means proportional to the voltage at the output of said integrating means.

References Cited in the file of this patent

UNITED STATES PATENTS

| | | |
|---|---|---|
| 2,415,919 | Thomas | Feb. 18, 1947 |
| 2,567,845 | Hoagland | Sept. 11, 1951 |
| 2,573,150 | Lacy | Oct. 30, 1951 |
| 2,595,124 | Campbell | Apr. 29, 1952 |
| 2,641,694 | Hallmark | June 9, 1953 |
| 2,761,968 | Kuder | Sept. 4, 1956 |
| 2,787,418 | MacKnight | Apr. 2, 1957 |
| 2,796,314 | Bishop et al. | June 18, 1957 |

OTHER REFERENCES

"ATV Contrast Generator and Gamma Checker," Radio & Television News, December 1950, pp. 40–42.

"Staircase Generator Counts Pulses," Electronics, March 1954, pp. 187–189.

UNITED STATES PATENT OFFICE

CERTIFICATE OF CORRECTION

Patent No. 2,918,574 — December 22, 1959

Donald J. Gimpel et al.

It is hereby certified that error appears in the printed specification of the above numbered patent requiring correction and that the said Letters Patent should read as corrected below.

Column 2, line 7, for "Fgure" read -- Figure --; column 9, line 2, for "couter" read -- counter --; column 10, lines 62 to 64, the formula should appear as shown below instead of as in the patent:

$$\frac{C_7}{C_8}\Delta E$$

column 11, line 17, for "cetain" read -- certain --.

Signed and sealed this 25th day of April 1961.

(SEAL)
Attest:

ERNEST W. SWIDER
Attesting Officer

DAVID L. LADD
Commissioner of Patents